United States Patent
Gotou et al.

(10) Patent No.: US 7,147,325 B2
(45) Date of Patent: Dec. 12, 2006

(54) CONTACT LENS AND PRODUCTION METHOD FOR CONTACT LENS

(75) Inventors: Yuuji Gotou, Komaki (JP); Kunio Maruyama, Nagoya (JP)

(73) Assignee: Menicon Co., Ltd., Nagoya (JP)

( * ) Notice: Subject to any disclaimer, the term of this patent is extended or adjusted under 35 U.S.C. 154(b) by 68 days.

(21) Appl. No.: 10/510,504

(22) PCT Filed: Mar. 25, 2003

(86) PCT No.: PCT/JP03/03639

§ 371 (c)(1),
(2), (4) Date: Oct. 7, 2004

(87) PCT Pub. No.: WO03/087920

PCT Pub. Date: Oct. 23, 2003

(65) Prior Publication Data

US 2005/0157256 A1 Jul. 21, 2005

(30) Foreign Application Priority Data

Apr. 12, 2002 (JP) ............................. 2002-110764

(51) Int. Cl.
*G02C 7/04* (2006.01)
(52) U.S. Cl. .................................. 351/160 R; 351/177

(58) Field of Classification Search ............ 351/160 R, 351/160 H
See application file for complete search history.

(56) References Cited

U.S. PATENT DOCUMENTS 3,944,347 A * 3/1976 Barkdoll et al. ......... 351/160 R
6,806,337 B1 * 10/2004 Schlueter et al. ....... 526/318.43

FOREIGN PATENT DOCUMENTS

JP 63-3910 * 1/1988

* cited by examiner

*Primary Examiner*—Jordan M. Schwartz
(74) *Attorney, Agent, or Firm*—Oliff & Berridge, PLC

(57) ABSTRACT

It is an object of the invention to ensure in a series of contact lenses composed of an assorted plurality of contact lenses having mutually different optical characteristics such as refractive power or the like that each contact lens is capable of exhibiting advantageously and consistently a good wear comfort and tear fluid exchange. In order to attain the object, the present invention arranges each contact lens 10a, 10b, 10c making up the series contact lens designed and having mutually different optical characteristics in the optical zone, such that not only is a shape of the lens back surface 14 of the optical zone 28 identified, but a shape of the peripheral zone 30 is identified at least the outer peripheral zone 44 that contributes to wear comfort and tear fluid exchange.

14 Claims, 6 Drawing Sheets

PRIOR ART

PRIOR ART

US 7,147,325 B2

CONTACT LENS AND PRODUCTION METHOD FOR CONTACT LENS

TECHNICAL FIELD

The present invention relates generally to contact lenses of soft type or hard type. More particularly, the invention relates to contact lenses of novel structure appropriate to being provided as a series containing an assorted plurality of contact lenses having optical characteristics of various kinds, and capable of ensuring excellent wear comfort in every optical characteristics, and to a method of manufacturing such contact lenses.

BACKGROUND ART

One shape known in the art and widely employed to date for both soft contact lenses and hard contact lenses (hereinafter referred to collectively as "contact lenses") is that depicted in FIG. 6(a), which has a back surface optical zone 50 formed in the center portion of the back surface of the lens and a back surface peripheral zone 52 formed along the outer circumference of this back surface optical zone 50, while having formed in the center portion of the front surface of the lens a front surface optical zone 54 and a front surface peripheral zone 56 formed along the outer circumference of this front surface optical zone 54, thereby forming an optical zone 58 in the center area of the lens and a peripheral zone 60 situated in the peripheral area of the lens.

When designing the shape of such a contact lens 62, the typical procedure includes: to first establish the diametric dimension: $D_{oz}$ of the back surface optical zone 50 and the diametric dimension: $D_{pz}$ of the front surface optical zone 54, as well as designing the shape of the back surface optical zone 50 and back surface peripheral zone 52 having a base curve of generally spherical shape conforming the shape of the wearer's cornea; to then establish lens thickness: t1 in a front surface junction (i.e. the connecting zone of the front surface optical zone and front surface peripheral zone) 64; and to then design the shape of the front surface optical zone so as to give the required diopter power, as well as establishing appropriate shape for the front surface peripheral zone on the basis of a function or arbitrary curve, so that a front surface junction 64 and an edge portion (peripheral edge of the lens) 66 join up smoothly.

Meanwhile, if the peripheral zone of a contact lens is too thin, it becomes difficult for the lens to consistently hold its shape, and particularly in the case of a soft contact lens may make it difficult to distinguish the front from the back, which can pose a risk of problems in handling. Also, since contact lenses are generally not provided on a purely "order-made" basis to wearer but are rather provided from a series prepared and provided as a combination lenses with optical zones that come in predetermined suitable number of diopter powers, with the lenses most suitable for the wearer being selected from the series. Thus, for each contact lens in the series having different front surface optical zone shapes in order to provide different diopter strengths, it is necessary to design lenses in such a way as to ensure consistent shape retention.

Thus, the typical practice in the past for a contact lens 62 like that illustrated in FIG. 6(a) having generally uniform thickness throughout the entire optical zone and low diopter power (for example, −1.0 diopter power) was to appropriately design the shape of the front surface peripheral zone 56 and the thickness dimension: t1 at the location of a front surface junction 64 so as to enable the lens to consistently hold its shape through the rigidity of the peripheral zone 60, thereby designating this as the base lens shape, and to then design for this base lens shape the front surface optical zones 54 that give different diopter powers. When using this design method, a predetermined acceptable minimum thickness is established with reference to the lens material and the like, and in the event that the lens center thickness is to thin owing to the diopter power of the front surface optical zone 54, the thickness of the front surface junction 64 and peripheral zone 60 is redesigned to be thicker, so that thickness at the lens center is at least equal to predetermined minimum thickness.

Specifically, where the required diopter power is more positive than that of the base lens, or where more negative but the absolute value of diopter power is small, the front surface optical zone 54 can be designed making the front surface junction 64 thickness and peripheral zone 60 shape generally uniform. Whereas if the diopter strength is much more negative than that of the base lens (e.g. −15 diopters), by redesigning lens thickness in the front surface junction 64 and peripheral zone 60 (in particular, a back surface junction 66 thickness: t2) to be greater than the base lens as shown in FIG. 6(b), for example, lens center portion thickness: t0 is obtained to be sufficient to ensure that there are no problems in terms of strength or durability. According to such design methods, none of the contact lenses in a series will have peripheral zone lens thickness smaller than that of the base lens shape, so that each of them can considerably hold lens shape on the basis of the rigidity of the peripheral zone.

In contact lenses of a series designed on the basis of the design method described above, depending on the diopter power established for the optical zone 58, and in particularly where diopter power is significantly negative, it becomes necessary to design and manufacture lenses that differ in shape according to the magnitude of diopter power, not just in the front surface optical zone 54, but over the entire front surface of the lens including the front surface peripheral zone 56. A resultant problem was that design and manufacture of contact lenses making up a series was tedious.

Additionally, research conducted by the inventors has shown that where contact lenses of series based on prior art design methods are provided, when diopter power differs among contact lenses of a given series, the thickness dimension of the peripheral zone 60 and mass associated therewith differ appreciably, which in some cases can result in differences in the movement of the contact lens over the cornea due to the action of the eyelid occurring with blinking, or the position of rest of the contact lens on the cornea due to the effect of gravity or the like, resulting in some instances in adverse effects on wear comfort and vision.

With the foregoing in view, it is therefore an object of the present invention to address these problems by providing contact lenses in a series composed of a combination of contact lenses of novel structure, whereby even in cases where diopter power or other optical characteristics differ, consistently good wear comfort can be achieved, while at the same time ensuring adequate shape retaining action by the peripheral zone and strength at the lens center.

It is a further object of the invention to provide a contact lens of novel shape effective for creating contact lenses of a series.

It is yet a further object of the invention to provide a novel method of manufacturing contact lenses, whereby contact lenses of a series may be manufactured efficiently.

Specifically, while various shapes for the back surface peripheral zone have been studied to date in consideration of tear fluid exchange and stability, the shape retaining effect of the peripheral zone thickness dimension in soft contact lenses has received only a cursory examination and is not viewed as particularly important. Research conducted by the inventors, however, has shown that the shape of the peripheral zone has significant effects on contact lens wear comfort and vision, and in particular that appreciable thickness of the peripheral zone including the front surface junction can result in appreciably impaired wear comfort owing to pressure applied by the eyelid and the like, as well as appreciable movement of the lens over the cornea by the eyelid during blinking, or a tendency of the lens rest position to shift vertically downward on the cornea due to the greater effect of gravity, or in other such problems.

DISCLOSURE OF THE INVENTION

The present invention has been developed based upon these new discoveries, and there will be described modes of the invention created for the purpose of addressing the above problems. Elements employed in each mode described herein may be employed in any possible combination. It is to be understood that the modes and technical features of the invention are not limited to those disclosed herein, but may otherwise be recognized based on the teachings of the present invention disclosed in the entire specification and drawings or that may be recognized based on concept of the invention recognized by those skilled in the art in the light of the present disclosure.

(First Mode of the Invention Relating to Series Contact Lenses)

The invention in a first mode thereof relates to a series of contact lenses provided as an assorted plurality of contact lenses, each lens being formed with an optical zone in a lens center area and a peripheral zone in a lens peripheral area, by forming a back surface optical zone in a center portion of a lens back surface as well as forming a back surface peripheral zone to an outer peripheral side of a back surface optical zone, while forming in a center portion of a lens front surface a front surface optical zone as well as forming a front surface peripheral zone to an outer peripheral side of the front surface optical zone, and having an identical diameter dimension but mutually different optical characteristics in the optical zone, the series of contact lenses being characterized in that in the assorted plurality of contact lenses, a shape of the lens back surface is identical for each lens, and a shape of an area extending a predetermined width in a diametrical direction of a peripheral portion in the front surface peripheral zone is identical for each lens, whereby while a shape of a portion extending a predetermined width in the diametrical direction of at least a peripheral portion in the peripheral zone is identical for each lens, a shape of the front surface optical zone differs among the lenses so that the optical characteristics of the optical zone differs among the lenses.

In the series of contact lenses according to this mode, by adopting a novel element which had not been conceived of to date, namely, a common shape for the peripheral zone, it is now possible to use identical shape (including identical thickness dimension) for most of the peripheral zone regardless of which contact lens in the series is employed; and thereby to effectively and consistently provide the wearer with good wear comfort, stable position of the lens on the cornea, and vision regardless of the optical characteristics of the optical zone selected on a wearer-by-wearer basis, as well as realizing dramatic improvements in contact lens performance and reliability. Additionally, when a given wearer must change the diopter power of a contact lens as myopia or other abnormal refraction progresses, the discomfort associated with wear of a contact lens with a different diopter power may be reduced or avoided.

Specifically, with a contact lens of a shape in accordance with conventional design methods, in the case of a diopter having high negative refractive power, there is a tendency for the peripheral zone to be thicker and therefore press against the eyeball or against the eyelid, and for the increased weight to cause the rest position of the lens on the cornea to shift downward, for example. The series contact lens according to this mode, on the other hand, since the shape of the peripheral zone is generally the same regardless of the level of refractive power, the discomfort associated with pressure on the eyeball or eyelid or a change in the rest position on the cornea, occurring with a change in set refractive power, can be reduced or avoided, thereby providing consistently good wear comfort and optical characteristics.

Further, in the series contact lenses having standardized peripheral zone shape according to this mode, contact lenses whose optical zones have different refractive power and other optical characteristics may nevertheless afford similar wear comfort and fitting pattern to the eye due to the generally identical shape of the peripheral zone, thereby making it possible to share a single or small number of trial lenses for use in fitting lenses to individual wearers, even where the optical characteristics required differ depending on the individual wearer. This makes it possible to obviate the need to prepare trial lenses for each set of optical characteristics of the optical zone.

Additionally, in this mode, it is preferable to standardize across different lenses making up a series the maximum thickness in the peripheral zone including the front surface junction, thereby providing a greater level of advantage in terms of consistent wear comfort and vision correction among the contact lenses that make up the series. In this mode also, it is preferable to standardize across the different lenses making up a series to establish the front surface junction, which is the boundary between the front surface optical zone and the front surface peripheral zone, diametrically inward from the back surface junction, which is the boundary between the back surface optical zone and the back surface peripheral zone, as well as standardizing, across the different lenses making up a series, at least the shape of the peripheral zone situated peripherally outside the back surface junction, thereby more effectively realizing the benefit of standardizing the peripheral zone in the manner described above.

(Second Mode of the Invention Relating to Series Contact Lenses)

The invention in a second mode thereof relates to a series of contact lenses according to the first mode, characterized in that different degrees of refractive power of the optical zone are established in the assorted plurality of contact lenses so that optical characteristics of the optical zone differ, and a diameter of the front surface optical zone is varied depending on differences in refractive power of the optical zones. According to this mode, it is possible, while using substantially identical shape lens diameter dimension (DIA) and peripheral zone shape in each contact lens making up the series, to readily vary the refractive power of the optical zone, i.e. diopter power. Also, while contact lenses constituting a series according to this mode mutually different diametrical width dimension of the peripheral zone, corresponding to the difference in diameter of optical zones due to the differences in refractive power established for optical zones, it is nevertheless possible, within an area of the peripheral zone formed on and existing in a contact lens, for the entirety thereof to be of shape identical to the peripheral zone of another contact lens belonging to the same series, but with different refractive power. In this mode also, in preferred practice each contact lens making up a series will have mutually different optical zone center portion thickness, depending on differences in diopter power established for the optical zones, whereby it becomes easier to employ the same given thickness of the front surface junction among contact lenses making up a series.

(Third Mode of the Invention Relating to Series Contact Lenses)

The invention in a third mode thereof relates to a series of contact lenses according to the first or second mode characterized in that the diameter of the front surface optical zone is set to within a range $\phi 5$ mm–$\phi 12$ mm in each of the assorted plurality of contact lenses. This mode makes it possible for a contact lens of typical size to more advantageously assure vision correction by the optical zone, stability of the lens on the cornea and tear fluid exchange by means of the peripheral zone, and the like. Where diameter of the optical zone is smaller than $\phi 5$ mm it becomes difficult to ensure the required optical area, posing the risk that it will be difficult to provide the wearer with consistent vision correction. On the other hand if the diameter of the optical zone is greater than $\phi 12$ mm it becomes difficult to ensure adequate diametrical width direction of the peripheral zone formed at the periphery of the optical zone, posing the risk of a decline in tear fluid exchange and stabilization of lens wear position by the peripheral zone.

(Fourth Mode of the Invention Relating to Series Contact Lenses)

The invention in a fourth mode thereof relates to a series of contact lenses according to any one of the first to third modes characterized in that different degrees of refractive power of the optical zone are established in the assorted plurality of contact lenses so that optical characteristics of the optical zone differ, and a center portion thickness of the front surface optical zone is varied depending on differences in refractive power of the optical zones. According to this mode, it is possible, while using substantially identical shape lens diameter dimension (DIA) and peripheral zone shape in each contact lens making up the series, to readily vary the refractive power of the optical zone, i.e. diopter power, and to do so with particularly good effectiveness in cases where the refractive power of the optical zone is relatively small. Furthermore, in cases where the optical zone has high refractive power, by combining this mode with the aforementioned second mode for example, it becomes even easier to vary the refractive power of the optical zone, i.e. the diopter power, while employing the same given lens diameter dimension (DIA) and peripheral zone shape among contact lenses making up a series.

(Fifth Mode of the Invention Relating to Series Contact Lenses)

The invention in a fifth mode thereof relates to a series of contact lens according to the fourth mode, characterized in that the center portion thickness of the optical zone is set to within a range of 0.02 mm–0.70 mm in each of the assorted plurality of contact lenses. According to this mode, in a contact lens of typical size, it is possible to ensure an optical zone diameter of a size able to assure good vision, as well as to assure peripheral zone width dimension and shape able to assure stability of the lens on the cornea and tear fluid exchange, while making it possible to establish an optical zone center portion thickness great enough to give adequate strength and durability. Where the center portion thickness in the optical zone is less than 0.02 mm, it becomes difficult to assure adequate strength and durability, whereas if the center portion thickness in the optical zone exceeds 0.70 mm, the peripheral zone including the front surface junction may become excessively thick.

(Sixth Mode of the Invention Relating to Series Contact Lenses)

The invention in a sixth mode thereof relates to a series of contact lens according to any one of the first to fourth modes, characterized in that different degrees of refractive power of the optical zone are established in the assorted plurality of contact lenses so that optical characteristics of the optical zone differ among these lenses, and the different degrees of refractive power of the optical zone are established within a range of −25 diopters to +25 diopters, with a difference of at least 5 diopters. According to this mode, in any contact lenses for which have been established mutually different diopter powers over a wide range of at least 5 diopters, preferably at least 10 diopters, it is possible to consistently provide a standardized level of good wear comfort over the contact lens series, so as to achieve excellent commercial value. This mode is advantageously realized by combining the aforementioned second mode and fourth mode, whereby it becomes possible to provide series contact lenses over a refractive power setting range of at least 5 diopters, preferably at least 10 diopters, having identical peripheral zone shape, and accordingly to realize excellent contact lens manufacture and manufacturing costs as described above, while also affording consistently good wear comfort and vision.

(Seventh Mode of the Invention Relating to Series Contact Lenses)

The invention in a seventh mode thereof relates to a series of contact lenses according to any one of the first to sixth modes characterized in that in each of the assorted plurality of contact lenses, the front surface peripheral zone is composed of a first front surface peripheral zone situated on an inner peripheral side and a second front surface peripheral zone situated on an outer peripheral side, with a first peripheral zone being formed between the first front surface peripheral zone and the lens back surface, and with a second peripheral zone being formed between the second front surface peripheral zone and the lens back surface, the second peripheral zone having a shape that decreases in thickness gradually going towards the outer peripheral side, and that among the assorted plurality of contact lenses, each the second peripheral zone is of identical shape, and the first front surface peripheral zone forming the first peripheral zone has a smooth surface connecting to both the front surface optical zone and the second front surface peripheral zone in the diametrical direction at a continuous face having a common tangent.

According to this mode, by varying the diametrical length of the first peripheral zone, it is possible for contact lenses making up a series to advantageously deal with even differences in diameter of the optical zones, while holding down increase in the thickness dimension of the first peripheral zone, as well as facilitating design and manufacture of the first peripheral zone, and accordingly of the contact lens per se. Additionally, since the front surface of the lens has smooth shape overall from the optical zone to the first and second front surface peripheral zones, it is possible to realize better wear comfort. Further, in this mode, thickness and curvature in the first peripheral zone can be made identical rather than differing among contact lenses making up a series, even where the optical zones differ in diameter.

(Eighth Mode of the Invention Relating to Series Contact Lenses)

The invention in an eighth mode thereof relates to a series of contact lenses according to the seventh mode characterized in that the first front surface peripheral zone is represented by a cubic curve in the diametrical direction. In this mode, it is possible to design the first front surface peripheral zone relatively easily with a high degree of freedom, as well as to machine the actual lens by means of cutting or the like.

(Ninth Mode of the Invention Relating to Series Contact Lenses)

The invention in a ninth mode thereof relates to a series of contact lenses according to the first to seventh modes characterized in that wherein in each of the assorted plurality of contact lenses, the diameter of the front surface optical zone is smaller than the diameter of the back surface optical zone, while the front surface peripheral zone is composed of a first front surface peripheral zone situated on an inner peripheral side and a second front surface peripheral zone situated on an outer peripheral side, and has a shape with the first front surface peripheral zone being in a location generally corresponding to the back surface optical zone, and with the back surface optical zone offset.

According to this mode, in contact lenses making up a series, diametrical length of the first peripheral zone is varied (while keeping thickness and curvature the same) in order to prevent increase of the thickness dimension of the first peripheral zone while more readily dealing with instances where, for example, the optical zone diameter varies, as well as further facilitating design and manufacture of the first peripheral zone, and hence of the contact lens.

In this mode, offset refers to a relationship in which the back surface and front surface of the first peripheral zone are parallel, with the thickness dimension made constant by means of giving identical curvature to the back surface and front surface. The amount of offset refers to the difference in radius of curvature of the offset back surface and front surface. Preferably, the amount of offset is set to 0.03 mm --0.50 mm. If the amount of offset is less than 0.03 mm, the first peripheral zone may become too thin and, depending on the lens material, may make it difficult to achieve adequate strength and durability, whereas if the amount of offset is greater than 0.50 mm, the first peripheral zone may become too thick, with the risk of deteriorated wear comfort in all contact lenses that make up the series.

(Tenth Mode of the Invention Relating to Series Contact Lenses)

The invention in a tenth mode thereof relates to a series of contact lenses according to the ninth mode, characterized in that in each of the assorted plurality of contact lenses, a first peripheral zone of generally constant thickness is formed by the first front surface peripheral zone and the back surface optical zone, and the second front surface peripheral zone is situated in a location generally corresponding to the back surface peripheral zone, the second front surface peripheral zone and back surface peripheral zone forming a second peripheral zone that decreases in thickness going towards the outer peripheral side, the peripheral zone being composed of the first peripheral zone and the second peripheral zone, and that in among the assorted plurality of contact lenses, each the second peripheral zone has identical shape and each the first peripheral zone has identical thickness, while the diametrical width dimension of the first peripheral zones vanes. In this mode, the shape of the second peripheral zone is identical in contact lenses making up a series, so that the peripheral zone is more standardized, as a result of which design and manufacture of contact lenses is further facilitated, and it becomes possible to more consistently achieve stability of the contact lens on the cornea and tear fluid exchange by means of the peripheral unit.

Further, in this mode it is preferable for the diametrical width dimension of the first peripheral zone to be 3.0 mm or less in any contact lens making up the series, whereby a large diametrical width dimension of second peripheral zone can be assured, and tear fluid exchange and stabilization of the contact lens on the cornea by the second peripheral zone can be made more consistent over all of the contact lenses making up the series. Additionally, the mode is advantageously employed in combination with the aforementioned second mode, whereby design and manufacture of the peripheral zone can be simplified while maintaining generally constant lens outside diameter (DIA), even in cases where diameter varies depending on refractive power of the optical zone.

(Eleventh Mode of the Invention Relating to Series Contact Lenses)

The invention in an eleventh mode thereof relates to a series of contact lenses according to any one of the first to tenth modes characterized in that a molding material for the assorted plurality of contact lenses in a soft material containing silicone. While it has been reported that soft materials containing silicone are effective in regards to oxygen permeability and the like, research conducted by the inventors has shown that such highly oxygen permeable, silicone-containing soft materials typically have a high frictional coefficient against the eyelid and a strong tendency to stick to the conjunctiva of the eye, resulting in a tendency to tack, or stick to or press against the cornea during blinking. By implementing the present invention in series contact lenses consisting of silicone-containing soft materials, it is possible to hold down thickness of the peripheral zone to a small level regardless of the magnitude of refractive power of the optical zone, as well as to provide consistent effect of the peripheral zone in terms of tear fluid exchange and position stabilization, thereby holding down tack and sticking so as to advantageously realize good wear comfort. In this mode, both hydrated contact lenses and non-hydrated contact lenses are similarly targeted as silicone-containing soft materials.

(Twelfth Mode of the Invention Relating to Series Contact Lenses)

The invention in a twelfth mode thereof relates to a series of contact lenses according to any one of the first to eleventh modes, characterized in that in the assorted plurality of contact lenses, the Young's modulus: y of the molding material is 0.2 MPa$\leq$y$\leq$2.0 MPa; and the value of average thickness: Tm of said peripheral zone is 0.05 mm$\leq$Tm$\leq$0.30 mm.

Specifically, research conducted by the inventors has shown for the first time that balance between the thickness dimension of the peripheral zone and the Young's modulus of the molding material is an important parameter in terms of good fit (wear comfort etc.) when a contact lens is worn. This mode is based upon this new discovery, and according to this mode, it is possible to permit appropriate movement over the cornea, as well as realizing good wear comfort.

Where y<0.2 MPa or where Tm<0.05 mm, while oxygen permeability of the contact lens can be readily assured, the contact lens will also tend to stick to the cornea, adversely affecting movement of the lens over the cornea and tending to depress tear fluid exchange. On the other hand, where y>2.0 MPa or where Tm>0.30 mm, pressure on the bulbar conjunctiva by the peripheral zone of the contact lens is high with a corresponding tendency for wear comfort to be appreciably deteriorated. In this mode, the dimensions and properties of the contact lens refer to conditions during wear. In this case of a hydrated contact lens material for example, these would represent the swelled state.

(Thirteenth Mode of the Invention Relating to Series Contact Lenses)

The invention in a thirteenth mode thereof relates to a series of contact lenses according to any one of the first to tenth modes characterized in that in the assorted plurality of contact lenses, the Young's modulus: y of the molding material is 300 MPa≦y≦1500 MPa; and the value of average thickness: Tm of said peripheral zone is 0.08 mm≦Tm≦0.50 mm.

This mode, as with the twelfth mode, was perfected on the basis of the discovery that thickness dimension of the peripheral zone and Young's modulus of the molding material are important parameters relating to contact lens wear comfort and the like, and affords good motion of the contact lens over the cornea and good wear comfort, particularly in the case of a hard contact lens.

(Fourteenth Mode of the Invention Relating to Series Contact Lenses)

The invention in a fourteenth mode thereof relates to a series of contact lenses according to any one of the first to thirteenth modes, characterized in that the back surface peripheral zone has a curving surface with a radius of curvature greater than that of the back surface optical zone in the diametrical direction. In this mode, during wear of the contact lens, the back surface peripheral zone is advantageously held in a state of floating up from the cornea, thereby moderating pressure against the bulbar conjunctiva by the edge portion, as well as promoting tear fluid exchange. In particular, a circular arc shape or elliptic arc shape in the diametrical direction may be used as the curving surface of the back surface peripheral zone, thereby facilitating its design.

(Mode of the Invention Relating to a Contact Lens)

The invention further relates to a contact lens being formed with an optical zone in a lens center area and a peripheral zone in a lens peripheral area, by forming a back surface optical zone in a center portion of a lens back surface as well as forming a back surface peripheral zone to an outer peripheral side of a back surface optical zone, while forming in a center portion of a lens front surface a front surface optical zone as well as forming a front surface peripheral zone to an outer peripheral side of the front surface optical zone, the contact lens characterized in that the diameter of the front surface optical zone is smaller than the diameter of the back surface optical zone on the one hand, and the front surface peripheral zone is composed of a first front surface peripheral zone situated on an inner peripheral side and a second front surface peripheral zone situated on an outer peripheral side, while by having a shape wherein the first front surface peripheral zone is offset to the back surface optical zone, with a first peripheral zone of generally constant thickness being formed by the first front surface peripheral zone and back surface optical zone, and by situating the second front surface peripheral zone at a location generally corresponding to the back surface peripheral zone, the second front surface peripheral zone and back surface peripheral zone form a second peripheral zone that decreases in thickness going towards the outer peripheral side, the peripheral zone being composed of the first peripheral zone and the second peripheral zone.

With a contact lens of structure according to this mode, it is possible to establish identical shape for the second peripheral zone, even when manufacturing several types of lenses with different optical zone diameter and lens outside diameter (DIA), thereby facilitating lens design and manufacture, as well as giving consistent levels of lens stabilization during wear and tear fluid exchange by a second peripheral zone of specific shape. Thus, reliability and consistency of product quality may be improved. According to the present invention, by providing a first peripheral zone extending with a given thickness in the diametrical direction, it becomes possible to establish a smaller value for maximum thickness dimension of the peripheral zone, regardless of the diopter power of the optical zone, and to thereby provide various levels of refractive power together with good wear comfort, even in contact lenses of soft type consisting of silicone-containing soft materials. Additionally, series contact lenses according to the invention as set forth hereinabove may be realized advantageously by means of contact lenses of structure according to the invention.

In a contact lens of structure according to the present invention, it is preferable to establish the thickness dimension of the second peripheral zone such that going diametrically outward it decreases at a constant rate with respect to a diametrical distance from the back surface junction. By designing the generally constant rate of constriction in thickness of the second peripheral zone going diametrically outward, it is possible to more advantageously avoid catching thereof on the eyelid, further improving wear comfort. Additionally, in order to design the thickness dimension in the lens center axis in the second peripheral zone to decrease going diametrically outward while holding down the maximum thickness dimension thereof, at a location lying the diametrical direction from the lens center axis, relative position of the second front surface junction (the boundary of the first peripheral zone and the second peripheral zone) and the back surface junction is established appropriately in consideration of the diopter power and material of the contact lens, and a second front surface junction is established preferably at a location within 3.0 mm in the diametrical direction from the back surface junction, more preferably within 2.0 mm in the diametrical direction from the back surface junction. By so doing, it is possible to readily design a shape for the back surface peripheral zone and second front surface peripheral zone whereby there can be achieved a first peripheral zone having constant thickness dimension, and a second peripheral zone whose thickness dimension decreases at a generally constant rate going diametrically outward, whereby it becomes possible, for example, to give the back surface optical zone, back surface peripheral zone, fist front surface peripheral zone, or second front surface peripheral zone the shape of a spherical face (a circular arc face viewed in cross section) having a center of curvature situated on the lens center axis.

In a contact lens of structure according to the present invention, in preferred practice the back surface peripheral zone will have a curving shape whose center of curvature is situated on the lens center axis, and whose radius of curvature is greater than that of the back surface optical zone, by means of which the back surface peripheral zone has a shape that, as compared to a line extended from the back surface, floats in the direction away from the cornea, so that pressure on the bulbar conjunctiva by the edge portion (outside peripheral edge of the contact lens) may be moderated.

(Mode of the Invention Relating to a Method of Manufacturing Series Contact Lenses)

The invention further relates to a method of manufacturing a contact lens constituting a series of contact lens according to the invention described hereinabove, and is characterized in that an entirety of the lens back surface including the back surface optical zone and the back surface peripheral zone, and an area of predetermined diametrical width of at least the outer peripheral portion of the front surface peripheral zone are shaped by molding.

Specifically, in contact lenses constituting series contact lenses according to the invention, even where optical characteristics differ among optical zones, the lens back surface in its entirety and at least the outer peripheral portion of the front surface peripheral zone of each lens have identical shape, whereby it is a simple matter to form these surfaces by means of molding forming using molds. Thus, it becomes possible to readily and consistently form the shapes of back surface and front surface peripheral zone of lenses. In the method of the present invention, while it is possible to form the front surface optical zone by molding as well, preferably, the front surface optical zone will be formed by means of cutting performed after molding of the lens back surface and front peripheral zone. In particular, when employing the method of the invention in a contact lens according to the eighth mode hereinabove relating to series contact lenses, it is possible in contact lenses making up the series to mold the entire front peripheral zone using a mold of identical shape, for example, in which case it will suffice to carry out a cutting process for the front surface optical zone only. In the cutting process itself, it is simpler to control the cutting tool than is the case where the peripheral zone is shaped by cutting as well, making the process easier and faster.

(Mode of the Invention Relating to a Method of Manufacturing a Contact Lens)

The invention further relates to a method of manufacturing a contact lens, characterized in that when manufacturing a contact lens being formed with an optical zone in a lens center area and a peripheral zone in a lens peripheral area, by forming a back surface optical zone in a center portion of a lens back surface as well as forming a back surface peripheral zone to an outer peripheral side of a back surface optical zone, while forming in a center portion of a lens front surface a front surface optical zone as well as forming a front surface peripheral zone to an outer peripheral side of the front surface optical zone, an entirety of the lens back surface including the back surface optical zone and the back surface peripheral zone, and an area extending over predetermined diametrical width of at least the outer peripheral portion of the front surface peripheral zone are shaped by molding, and the front surface optical zone of the lens front surface is then shaped by cutting.

According to the method of the present invention, by changing the cutting pattern of the front surface optical zone in order to modify appropriately the shape of the front surface optical zone, it is a simple matter to establish various optical characteristics. Additionally, since areas other than the front surface optical zone, namely, the back surface optical zone, the back surface peripheral zone, and the front surface peripheral zone, are all formed by means of molding, these are easy to manufacture. In particular, since optical characteristics are determined by the shape of the front surface optical zone, it is possible to standardize mold shape for contact lenses of which different optical characteristics are required, so that manufacturing cost may be improved. Additionally, as compared to the case where both the front surface optical zone and the front surface peripheral zone are formed by cutting, the fact that only the front surface optical zone is formed by cutting makes it easier to control the cutting tool, making possible further improvement in manufacturing cost and reduction in time required for manufacture.

In the method of manufacturing a contact lens pertaining to the method of the invention, it is preferable to set minimum lens thickness in said optical zone of said lens front surface prior to shaping by cutting to within the range 0.05 mm –1.0 mm. If minimum lens thickness is less than 0.05 mm, depending on the lens material, adequate component strength may not be displayed during the cutting process of the optical zone, with a risk of a deformation-induced drop in machining accuracy, breakage or other problem. Whereas, if minimum lens thickness is greater than 1.0 mm, the cutting process will require an extended period of time, and a considerable amount of material will need to be cut, posing the risk of a significant load on the cutting tool or other problems.

BEST MODE FOR CARRYING OUT THE INVENTION

In order to illustrate the invention more concretely, the embodiments of the invention are described in detail hereinbelow, making reference to the accompanying drawings.

Figure 1:
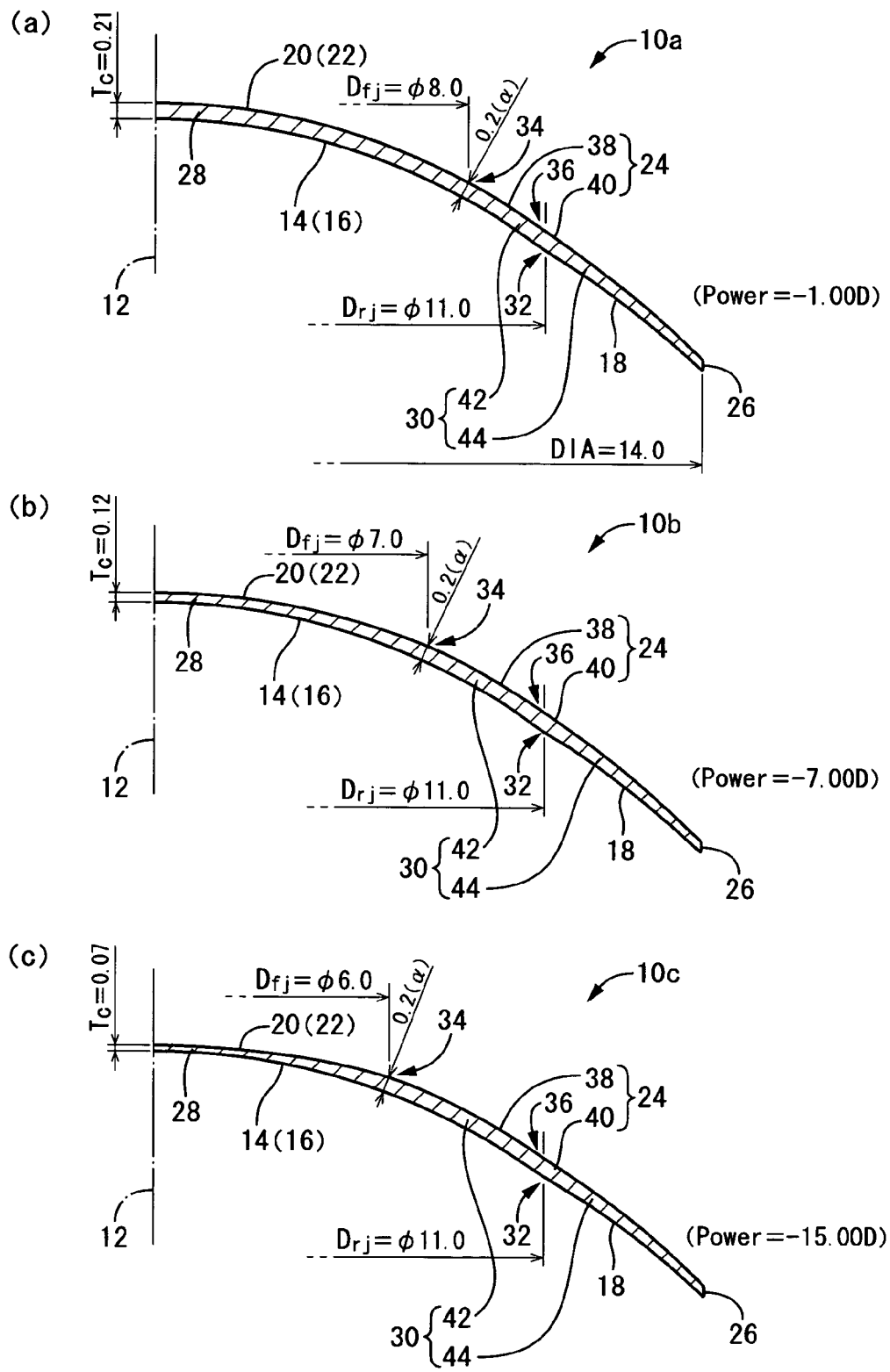
FIG. 1 shows radial sectional views (a), (b), (c) of three exemplary contact lenses making up a series of contact lenses in a first embodiment of the invention.
Figure 2:
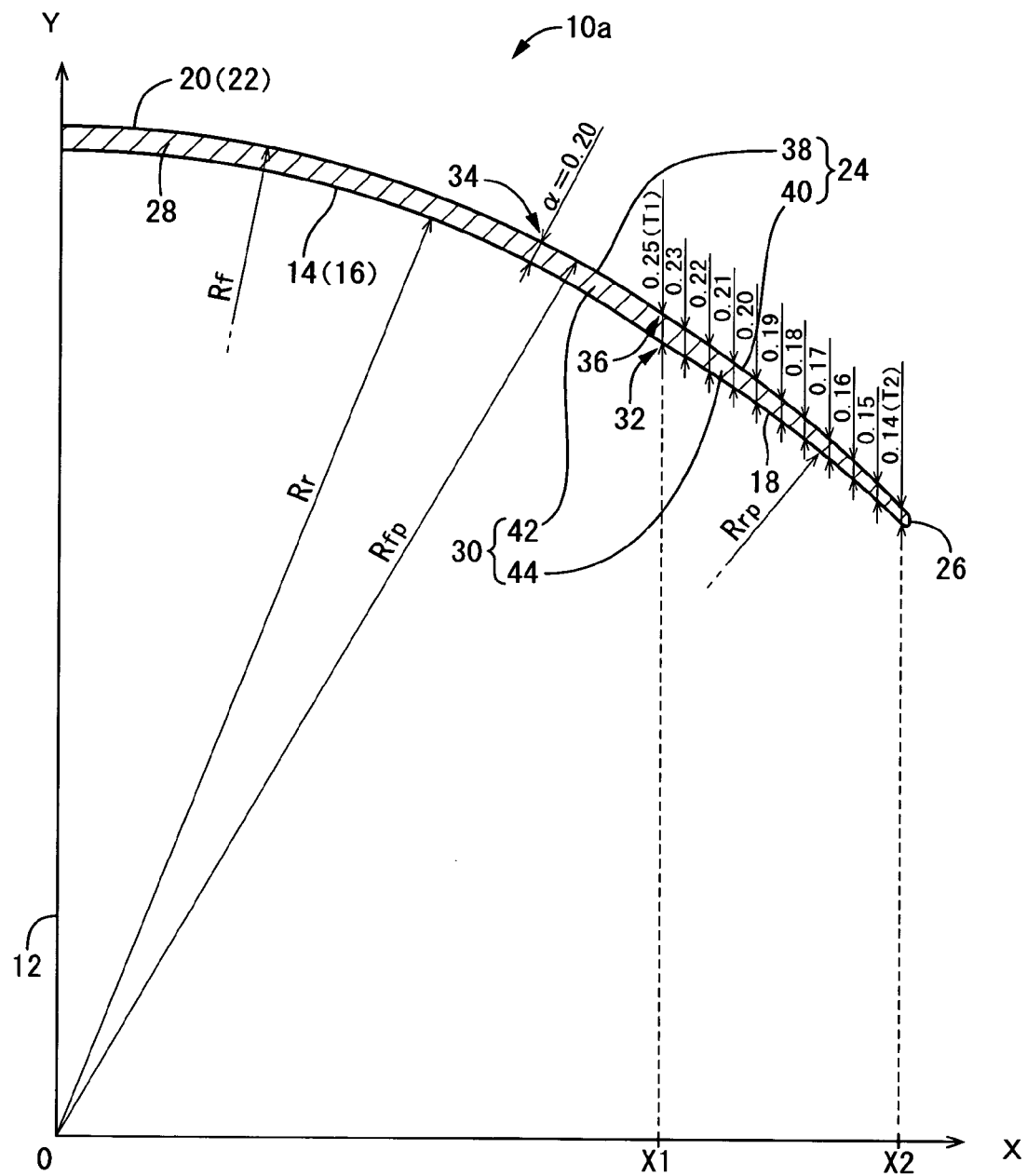
FIG. 2 is an enlarged fragmentary view of the contact lens shown in FIG. 1(*a*).

FIGS. 1(*a*), (*b*), and (*c*) depict as one embodiment of the invention a plurality of contact lenses 10*a*, 10*b*, 10*c* selected appropriately from a series of contact lenses. The series contact lenses are composed of combinations of a plurality of contact lenses whose optical zones have mutually different optical characteristics, for example, different refractive power (diopter power), and are provided to the wearer through suitable selection, from among the plurality of contact lenses, of one contact lens having optical characteristics appropriate for the wearer. The selection is made on the basis of the results of an examination of the optical system of the eye of the wearer by an ophthalmologist or other examiner. Here, the contact lenses 10*a*, 10*b*, 10*c* which are constituent elements of a series of contact lenses each have a shape that overall has the form of a partial spherical shell, and is intended to be worn in the usual manner, i.e. superimposed on the surface of the cornea of the eye. Each of the contact lenses 10*a*, 10*b*, 10*c* of this embodiment has a lens center axis 12 constituting the optical axis, i.e. the optical center axis of the optical zone, and since each contact lens 10*a*, 10*b*, 10*c* is formed as a body of rotation shape about this lens center axis 12, only radial cross section is shown in each of FIGS. 1(*a*), (*b*), and (*c*). To facilitate understanding, an enlarged illustration of contact lens 10*a* is shown in FIG. 2. The following description makes reference to both FIGS. 1 and 2. In the following description, as a general rule the "radial direction" of contact lenses 10*a*, 10*b*, 10*c* refers to the direction of a straight line at a right angle to the lens center axis 12; "radial dimension" and "radial width dimension" refer to dimensions extending on the line in the direction of the straight line.

To describe in more detail, each contact lens 10 (herein, in the case that specific symbols a, b, c are absent, lenses a, b, and c are referred to collectively) has a lens back surface 14 of generally spherical concave surface shape. This surface is formed by a back surface optical zone 16 located in the central portion and a back surface peripheral zone 18 located in the peripheral portion. The lens front surface 20 is of generally spherical convex surface shape, this face being formed by a front surface optical zone 22 located in the central portion and a front surface peripheral zone 24 located in the peripheral portion. The back surface optical zone 16 and front surface optical zone 22 are each circular in front view along the direction of the center axis 12, while the back surface peripheral zone 18 and front surface peripheral zone 24 are each of annular shape in front view. An annular edge portion 26 is formed around the entire circumference of the contact lens 10. By means of this edge portion 26, the back surface peripheral zone 18 and front surface peripheral zone 24 are connected together at their outer peripheral edges.

Also formed in the contact lens 10 in the center portion thereof is an optical zone 28 having a suitable level of refractive power for vision correction, the zone having circular shape in front view. This optical zone 28 is formed in an area bordered on either side by the back surface optical zone 16 and the front surface optical zone 22. To the outer peripheral side of optical zone 28 is formed a peripheral zone 30 of annular shape of predetermined width in front view, extending between the optical zone 28 and the edge portion 26. This peripheral zone 30 is formed in an area bordered on either side by the outside peripheral portion of the back surface optical zone 16 or the back surface peripheral zone 18 and the front surface peripheral zone 24, and has an action of promoting tear fluid exchange during wear, and of stably retaining the contact lens 10 in the appropriate position on the cornea.

Dimension and shape of the optical zone 28 and peripheral zone 30, and their constituent back surface optical zone 16, back surface peripheral zone 18, front surface optical zone 22, and front surface peripheral zone 24 are determined appropriately in consideration of the shape and dimensions of regions such as the wearer's cornea, pupil, and eyelid, and of the optical characteristics required, and as such are not limited. However, to facilitate understanding herein, the description employs specific numerical values by way of example.

Specifically, in this embodiment, the diameter dimension (outermost diameter dimension, designated as DIA) of contact lenses 10 is of constant size established within the range 13–15 mm. The diameter Drj of the back surface junction 32 which is the boundary of the back surface optical zone 16 and the back surface peripheral zone 18 is equal to about 80% of the DIA. The diameter dimension Dfj of the first front surface junction 34 which is the boundary of the front surface optical zone 22 and the front surface peripheral zone 24 is smaller than that of the back surface junction 32. The diameter dimension of the first front surface junction 34, specifically, the diameter of the front surface optical zone 22, is established within the range $\phi$5 mm–$\phi$12 mm.

Here, the back surface optical zone 16 is given a spherical concave surface generally corresponding to the shape of the surface of the cornea of the wearer in order to provide good wear comfort. It is given, for example, a spherical surface with a radius of curvature Rr having the curvature center on the lens center axis 12. In order to achieve good tear fluid exchange, the back surface peripheral zone 18 is given, for example, a spherical surface with a radius of curvature Rrp larger than that of the back surface optical zone 16, and having the curvature center on the lens center axis 12. By so doing, the back surface peripheral zone 18, with the back surface junction 32 as a point of support, is disposed floating up slightly from the corneal surface as one moves diametrically outward, thereby reducing pressure on the bulbar conjunctiva by means of a "hinge" action so as to improve wear comfort, as well as improving tear fluid exchange. The back surface junction 32 will preferably be formed with an appropriately chamfered, rounded edge having a small radius of curvature, so as to avoid an intersect point configuration having corners in the diametrical cross section of the lens.

In order to produce in the optical zone 28 the optical characteristics required to correct the vision of the wearer, the front surface optical zone 22 is designed in consideration of the shape of the back surface optical zone 16. For instance, where correcting for myopia or correcting for hypermetropia, and where the back surface optical zone 16 is a spherical surface, it will be designed by selecting a spherical surface shape having a radius of curvature Rf that differs from the radius of curvature Rr of the back surface optical zone 16 and having its center of curvature on the lens center axis 12, so as to give the appropriate diopter power (negative or positive diopter)

The front surface peripheral zone 24 extends between the outer peripheral edge of the front surface optical zone 22 and the edge portion 26, with the inner peripheral edge of the front surface peripheral zone 24 connecting to the outside peripheral edge of the front surface optical zone 22 at the first front surface junction 34. In the diametrically medial portion of the front surface peripheral zone 24 is formed a second front surface junction 36 which is a curvature inflection point. With this arrangement, the front surface peripheral zone 24 is composed of a first front surface peripheral zone 38 of annular shape in front view, situated between the first front surface junction 34 and the second front surface junction 36, and a second front surface peripheral zone 40 of annular shape in front view, situated between the second front surface junction 36 and the edge portion 26.

The relative spacing dimension of the second front surface junction 36 and back surface junction 32 in the diametrical direction is preferably 3.0 mm or less, more preferably 2.0 mm or less. In the illustrated embodiment in particular, diametrical dimensions of the first front surface junction 34 and the back surface junction 32 are generally the same (Drj). The diametrical distance between the first front surface junction 34 and the second front surface junction 36, in other words, the diametrical width direction of the first front surface peripheral zone 38, is preferably set to 3.0 mm or less. In this embodiment, by so doing, the peripheral zone 30 is divided shapewise into two, i.e. an inner peripheral side and an outer peripheral side, thereby forming a first peripheral zone 42 in an area bordered on either side by the first front surface peripheral zone 38 and the back surface optical zone 16, as well as forming a second peripheral zone 44 in an area bordered on either side by the second front surface peripheral zone 40 and the back surface peripheral zone 18. That is, in this embodiment, the diametrical width dimension of the first peripheral zone 42 having constant thickness dimension is the same as the diametrical width dimension of the first front surface peripheral zone 38 [(Dij—Dfj)/2], and the width dimension thereof is 3.0 mm or less.

The first front surface peripheral zone 38 has a bowed surface offsetting the back surface optical zone 16, and has the same center point: O as the back surface optical zone 16, as well as being formed with a radius of curvature: Rfp=Rr+α that is greater by a predetermined amount of offset: α than the a radius of curvature: Rr of the back surface optical zone 16. With this arrangement, the first front surface peripheral zone 38 is given generally constant thickness dimension (α) over its entirety. The amount of offset: α is preferably set within a range of 0.03 mm–0.5 mm in consideration of the lens material and the like; in this embodiment, α=0.2 mm.

Additionally, the second front surface peripheral zone 40 is situated extending outwardly beyond the back surface peripheral zone 18. The shape of the second front surface peripheral zone 40 does not offset the back surface peripheral zone 18, but is designed especially in consideration of the shape of the back surface peripheral zone 18, with the thickness dimension of the portion bordered on either side by the second front surface peripheral zone 40 and the back surface peripheral zone 18 gradually decreasing as one moves diametrically outward from the back surface junction 32 towards the edge portion 26. In particular, in this embodiment, the thickness dimension in the direction parallel to the lens center axis 12 in the second peripheral zone 44 is established according to the equation below, so as to decrease at a constant rate (Rate) in the diametrical direction as shown in FIG. 2

$$Rate=(T1-T2)/(X2-X1).$$

T1 denotes the thickness dimension of the inner peripheral edge of the second peripheral zone 44, and T2 denotes the thickness dimension of the outer peripheral edge of the second peripheral zone 44. X1 is the diametrical distance of the inner peripheral edge of the second peripheral zone 44 from the lens center axis 12, and X2 is the diametrical distance of the outer peripheral edge of the second peripheral zone 44 from the lens center axis 12.

In FIG. 2 are shown by way of example specific numerical values for thickness dimension in a second peripheral zone 44 designed according to this embodiment, having a lens thickness dimension T1=0.25 mm in the inner peripheral edge portion of the second peripheral zone 44, as well as a lens thickness dimension T2=0.14 mm in the outer peripheral edge portion of the second peripheral zone 44.

In order to avoid an intersect point configuration having corners in the diametrical cross section of the lens, the first front surface junction 34 and the second front surface junction 36, like the back surface junction 32, preferably join at surfaces bordering the junction 34, 36 to either side in the diametrical direction connected by a common tangent, or at surfaces to either side connected by an appropriately chamfered, rounded surface having a small radius of curvature.

Here, the second front surface junction 36, together with the outside diameter dimension (DIA) of the edge portion 26, is fixed in each contact lens 10 making up the series of contact lenses. With this arrangement, the second peripheral zone 44 in each of the contact lenses 10a, 10b, 10c can be formed in its entirety with the same shape having the same thickness dimension and radius of curvature at the same location in the lens outer peripheral portion.

Likewise, in each of the contact lenses 10a, 10b, 10c, the first peripheral zone 42 can be formed with the same thickness dimension throughout its entirety, and mutually identical values for thickness dimension: T1 (or α) thereof can be established for it.

The diametrical location of the first front surface junction 34, in other words the diametrical location of the inner peripheral edge of the first peripheral zone 42, that is, the diametrical width dimension of the first peripheral zone 42 differs as needed among the contact lenses 10a, 10b, 10c that make up the contact lens series. At least the contact lens having the optical zone 28 whose diopter value: P is highest on the negative side will have its first front surface junction 34 situated further inward in the diametrical direction than will the contact lens having the optical zone 28 with the diopter value closest to 0.

Here, diametrical location of the first front surface junction 34 is determined such that, where the shape of the front surface optical zone 22 is designed with the thickness dimension of the outer peripheral portion of the front surface optical zone 22 is the thickness dimension of the first front surface junction 34 (in this embodiment, α=0.2 mm), lens thickness: Tc at the lens center axis 12 is not smaller than the minimum allowable thickness established in consideration of the lens material and other factors. That is, where the minimum allowable thickness is 0.07 mm, the diametrical location of the first front surface junction 34 is manipulated such that Tc≧0.07 mm. In preferred practice, the diametrical dimension: Dfj of the first front surface junction 34 from the center axis 12 is such that 2.5 mm≦Dfj≦6.0 mm. If the value of this diametrical dimension: Dfj is smaller than 2.5 mm, the optical zone will become too small, with the risk of making it difficult to consistently achieve effective vision correction; if on the other hand the value of this diametrical dimension: Dfj is greater than 6.0 mm, there is a risk of making it difficult to ensure adequate diametrical width dimension on the part of the second peripheral zone 44, possibly resulting in impaired tear fluid exchange action and lens position stabilizing action by the second peripheral zone 44.

Under design conditions for the peripheral zone 30 in an embodiment like that shown in FIG. 2, where the diopter power of the optical zone 28 has been set to −1.00 diopter, −7.00 diopters, and −15.00 diopters, respectively, the specific designed shapes of the front surface optical zone 22 will be as shown in FIGS. 1(a), (b) and (c). As shown in FIG. 1, in the series of contact lenses of this embodiment, the diametrical dimension of the front surface optical zone 22 is established through adjustment with reference to the diopter power established for the optical zone 28. As noted, in each of the contact lenses 10 shown in FIGS. 1(a), (b) and (c), the second peripheral zone 44 has identical shape, while the first peripheral zone 42 is a spherical shape spreading out with the same thickness dimension and same curvature.

Accordingly, in series of contact lenses having the structure described above, each of the contact lenses 10a, 10b, 10c making up the series has mutually identical shape at a minimum in the second peripheral zone 44 which is a zone of predetermined diametrical width in the outer peripheral portion of the peripheral zone 30, whereby the tear fluid exchange action and lens position stabilizing action afforded by the second peripheral zone 44 can be effectively and consistently displayed regardless of which contact lens 10a, 10b, 10c is selected.

Furthermore, in each of the contact lenses 10a, 10b, 10c, not only is the shape of the second peripheral zone 44 the same, but the thickness dimension of the first peripheral zone 42 formed to the inner peripheral side thereof is the same over the entire extension thereof, whereby regardless of the diopter power of the optical zone 28, the lens maximum thickness dimension will be identically thin, and thus even in a contact lens having high negative diopter power, a thicker peripheral zone 30 can be avoided, the impaired wear comfort associated with a thicker peripheral zone 30 can be prevented, and good wear comfort can be advantageously and consistently achieved.

In this embodiment, not only the diametrical dimension of the front surface optical zone 22, but also the lens center thickness: Tc is adjusted depending on the diopter power established for the optical zone 28, whereby lens thickness in the peripheral zone can be made consistently thin, while adequate diametrical dimension: Dfj on the part of the optical zone 28 can be advantageously assured, even where a contact lens has high negative diopter power, so that the optical characteristics required of the optical zone 28 can be effectively achieved.

In the peripheral zone 30, as noted, on the basis of the diametrical width dimension needed in order to advantageously produce tear fluid exchange action and the like on the part of a second peripheral zone 44 able to provide tear fluid exchange action and the like, there is formed an area of predetermined diametrical width in the outer peripheral portion, as well as forming a first peripheral zone 42 that extends with generally constant thickness dimension towards the inner peripheral side. Therefore, even in a contact lens 10a having diopter power (diopter value) of close to 0, it is possible to advantageously form the peripheral zone 30 with adequate diametrical width dimension while keeping its maximum thickness at a minimum, and as a result to reduce the thickness and mass of the peripheral zone 30, ensuring further improvement in wear comfort and proper stable positioning of the lens.

The results of clinical tests conducted using the contact lens 10a shown in FIG. 1(a), whose optical zone 28 has diopter power (P) of −1.00, and the contact lens 10b shown in (b), whose optical zone 28 has diopter power (P) of −7.00, are shown in Table 1 appearing below. Each contact lens 10(a), 10(b) was of soft type consisting of silicone-containing non-hydrated soft material (Young's modulus (y)=0.5 MPa), DIA=14.0 mm, Drj=11.0 mm, Rr=8.4 mm, and α=2.0 mm; other morphological details are in accordance with FIGS. 1 and 2.

Figure 6:
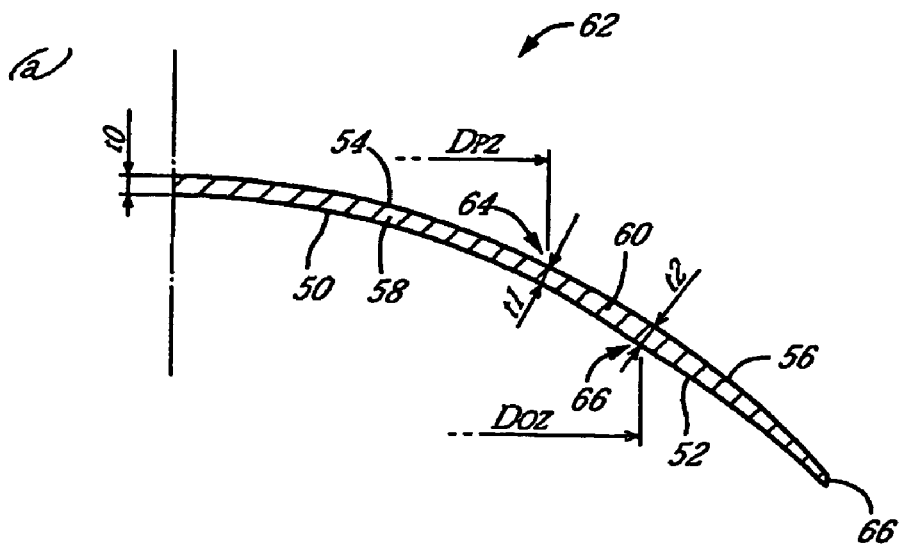
FIG. 6 shows radial sectional views (a), (b) of two exemplary contact lenses making up a conventional series of contact lenses.
Figure 6:
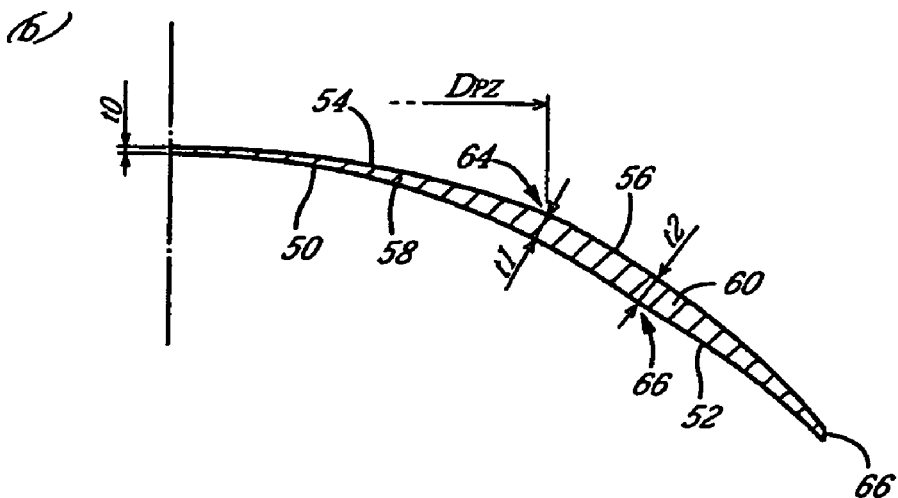

Clinical tests similar to those in this example were also carried out using contact lenses of conventional structure, namely, as shown in FIGS. 6(a) and (b), contact lenses 62a, 62b of shape determined by conventional design methods, having a back surface optical zone 50 and back surface peripheral zone 18 identical in shape to those in the example, and optical zone 58 diopter power (P) of −1.00 and −7.00, the same as in the example. Data for these Comparative examples is given in the Table 1 as well. In each of the contact lenses 62a, 62b of the Comparative examples, the front surface peripheral zone 56 was of spherical shape having a single radius of curvature over the entirety thereof, in accordance with conventional structure. The contact lenses 62a, 62b of Comparative examples are soft contact lenses of same silicone-containing soft material as those in the example.

TABLE 1

| | Examples | | Comparative Examples | |
| --- | --- | --- | --- | --- |
| Evaluation item | P = −1.00 (diopters) | P = −7.00 (diopters) | P = −1.00 (diopters) | P = −7.00 (diopters) |
| fitting | Normal | Normal | Normal | Loose |
| amount of lens motion | 1.0 mm | 1.0 mm | 1.0 mm | 2.0 mm |
| lens rest position | center | center | center | lower side |
| pressure by lens peripheral zone | no pressure | no pressure | center pressure | lower side pressure |
| wear comfort | good | good | poor | poor |
| stability of vision | stable | stable | stable | unstable |

From the clinical results given in Table 1, it will be apparent that the contact lenses of the example afford consistently good wear comfort and lens stability, irrespective of the magnitude of the diopter power established for the optical zone 28.

For contact lenses consisting of soft materials (silicone-containing types) having Young's modulus (y) values of 0.2–2.0 MPa, and contact lenses consisting of hard materials (oxygen permeable types) having Young's modulus (y) values of 300–1500 MPa, tests were conducted in the same manner as the clinical tests described above, while varying the thickness dimension of the peripheral zone 30 of each. As a result, it was found that in both soft and hard contact lenses, if the thickness dimension of the peripheral zone 30 is too small, particularly for a lens consisting of oxygen permeable material, while oxygen permeability will be generally good, the contact lens will tend to stick to the cornea or bulbar conjunctiva, so that movement of the contact lens over the eye is poor and tear fluid exchange tends to decline. With soft lenses, whereas, there is an additional risk of poor handling due to inability to distinguish between back and front, or other problems. On the other hand, if the thickness dimension of the peripheral zone 30 is too great, there will be considerable pressure against the bulbar conjunctiva by the peripheral zone of the contact lens, as well as a tendency for wear comfort to be adversely affected, and other problems.

Accordingly, it is necessary to design the thickness of the peripheral zone 30 appropriately in consideration of the required contact lens characteristics, and in this regard it became clear that appropriate thickness dimension of the peripheral zone 30 differs appreciably depending on the Young's modulus (y) of the contact lens material.

Testing and verification conducted by the inventors has clearly shown that in the case of a soft contact lens of a contact lens molding material with a Young's modulus: y value of $0.2\ \text{MPa} \leq y \leq 2.0$ MPa, peripheral zone 30 average thickness: Tm values such that $0.05\ \text{mm} \leq \text{Tm} \leq 0.30$ mm are effective. On the other hand, in the case of a hard contact lens of a contact lens molding material with a Young's modulus: y value of $300\ \text{MPa} \leq y \leq 1500$ MPa, peripheral zone 30 average thickness: Tm values such that $0.08\ \text{mm} \leq \text{Tm} \leq 0.50$ mm are effective, in terms of achieving better wear comfort.

In preferred practice, the Young's modulus of a contact lens material will be measured using a test piece of shape appropriate for the target contact lens. Where a thick, large test piece is employed without consideration of contact lens product shape, since even for a given material, the processing time for each step and other aspects of the manufacturing process different between a test piece taken from a large block and a thin molded contact lenses, the physical properties of these will differ to an extent that cannot be ignored.

Specifically, it is possible to use a commercially available universal materials tester as the testing machine, for example, Model 4301 from Instron Japan Inc. As the test piece, it is preferable to use as the test piece a special one having a generally dumbbell shape in plan view and total length of approximately 12–25 mm, produced by punching out a molded sheet profile of thickness of approximately 0.75 mm±0.05 mm, and integrally molding at both ends thereof wide grip portions to a center portion that extends linearly with a constant cross section of predetermined width dimension.

Following is a description of a specific example of an advantageous method of making contact lenses 10 of this embodiment having the structure set forth hereinabove.

Figure 3:
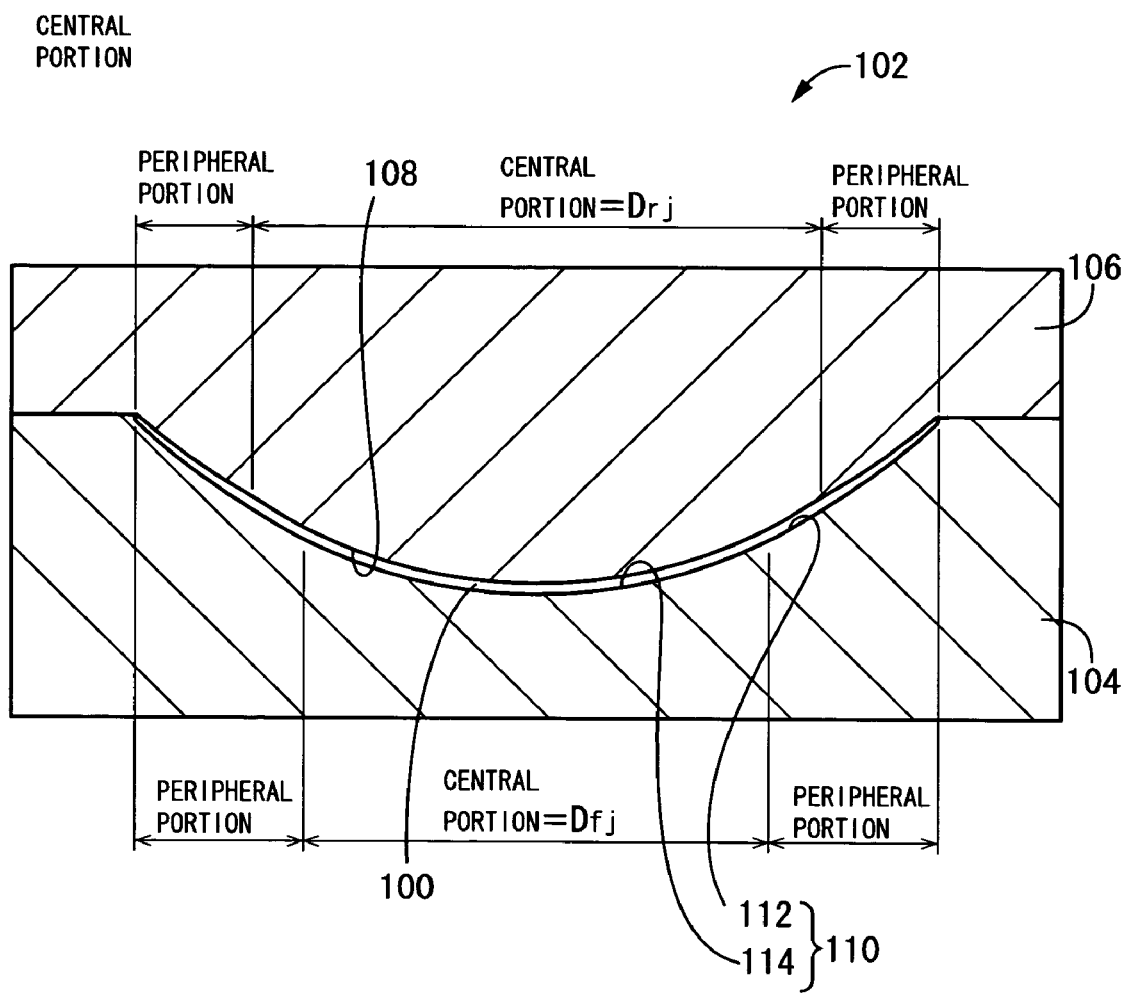
FIG. 3 is a radial sectional view showing a specific example of a mold forming mold for use in forming the contact lens shown in FIG. 1.

When making the contact lens 10, first, as shown in FIG. 3, there is prepared a forming mold 102 with a mold cavity 100 corresponding in shape of the shape of the target contact lens 10. This forming mold 102 is of split structure comprising a lower mold 104 and an upper mold 106. By mating the two molds together, the mold cavity 100 is produced at the mating faces of the lower and upper molds 104, 106.

Here, a mold face 108 serving as the cavity-forming face of the upper mold 106 is shaped with shape substantially identical to the entire lens back surface of the target contact lens 10, including the back surface optical zone 16 and back surface peripheral zone 18. On the other hand, a mold face 110 serving as the cavity-forming face of the lower mold 104 is shaped in the outer peripheral portion 112 thereof with shape substantially identical to the front surface peripheral zone 24 of the target contact lens 10, and in the center portion 114 thereof generally offsets the front surface optical zone 22 outwardly from the curvature center thereof so as to form a center portion thicker than the optical zone 28 of the target contact lens 10.

The optical zone 28 of the target contact lens 10, which must be taken into consideration when establishing the shape of the center portion 114 of the mold face 110, is the thickest optical zone 28 among all of the contact lenses 10 of various diopter powers making up the contact lens series. With this arrangement, the forming mold 102 can be used during molding of all of the contact lenses 10 of various diopter powers making up the contact lens series.

That is, when using such a forming mold 102 to form contact lenses 10, the mold face 110 of the opened lower mold 104 is opened facing upward, and a predetermined amount of monomer material for molding the contact lens is injected therein. The upper mold 106 is then juxtaposed against the lower mold 104 from above so that the monomer material fills the mold cavity 100 defined between the lower and upper molds 104, 106. Then, the monomer material is subjected to some suitable process such as irradiation with ultraviolet, heating, or the like, to promote polymerization, thereby molding a contact lens blank.

The contact lens blank obtained in this manner has a lens back surface the entirety of which is the same shape desired of the target contact lens 10. The lens front surface, in the first and second front surface peripheral zones 38, 40 thereof, is also of the same shape desired of the target contact lens 10. That is, the contact lens blank is molded into generally the same shape as the target contact lens 10, with the exception of substantially all of the front surface optical zone 22.

The contact lens blank is then subjected to a cutting process of the front surface optical zone 22 thereof only, to complete the target contact lens 10. The cutting process may be carried out advantageously on the contact lens blank while it is still deposited on the lower mold 104, by gripping the lower mold 104 in the chuck of the cutting apparatus and cutting the contact lens blank with the appropriate bite as it revolves about the lens center axis, for example.

According to this manufacturing method, it is possible to mold the entire contact lens, except for the front surface optical zone 22, by means of a forming mold 102 with substantially a single shape, and to then simply by adjusting the amount of cutting of the front surface optical zone 22, produce contact lenses 10a, 10b, 10c with different diopter powers in the series of contact lenses, thereby making it possible to manufacture series contact lenses very efficiently.

Additionally, when making contact lenses 10 that have different optical characteristics such as diopter power, since peripheral zones 30 are molded with identical shape, the level of polymerization shrinkage of the monomer material, which differs with shape such as thickness dimension, will be generally the same for each contact lens 10a, 10b, 10c making up a contact lens series, which provides the significant technical advantage that a high degree of shaping accuracy can be consistently assured.

Also, when cutting a contact lens blank, since the front surface peripheral zone 24 is molded into the target shape, it is sufficient simply to subject the lens front surface 20 to a cutting process, making it easy to control the cutting tool and other factors, so that simpler controls and cutting apparatus may be used, and the cutting process may be accomplished quickly.

The extent of cutting (cutting depth) of the front surface optical zone 22 of a molded contact lens blank needed to give the target contact lens 10 will preferably be 0.05 mm −0.50 mm, whereby it is possible to consistently carry out the cutting process with a high degree of accuracy, and quickly and easily as well. When cutting contact lens blanks of single shape to form all of the contact lenses making up a series of contact lenses, where the extent of cutting of the front surface optical zone 22 would be excessive, it would be possible to instead employ two, three, or more forming molds 102 to make two, three, or more types of contact lens blanks. In this case, the upper mold 106 could be standardized.

Figure 4:
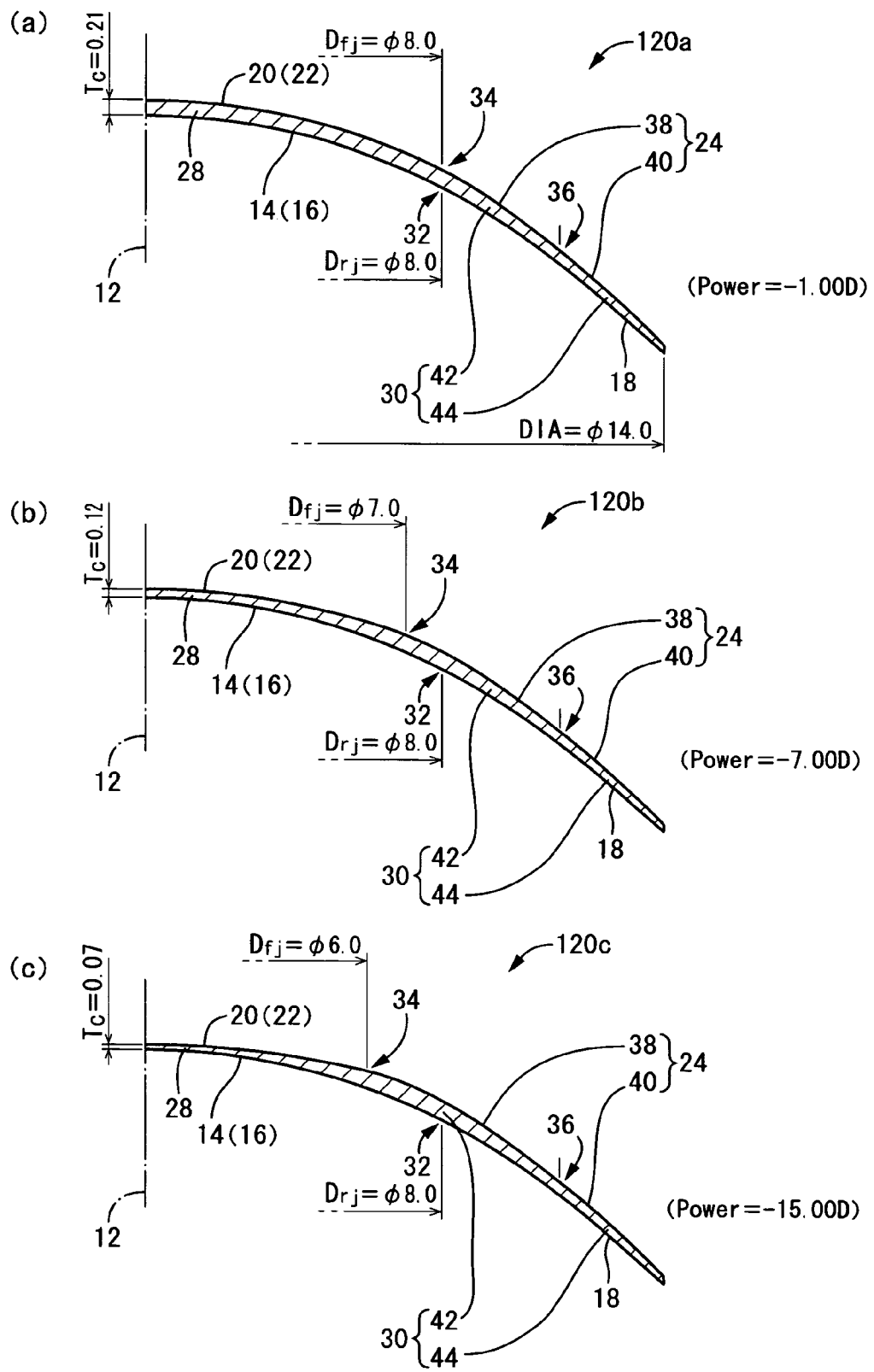
FIG. 4 shows radial sectional views (a), (b), (c) of three exemplary contact lenses making up a series of contact lenses in a second embodiment of the invention.

In FIGS. 4(*a*), (*b*), and (*c*) are shown a plurality of contact lenses 120a, 120b, 120c selected appropriately from among lenses making up a series of contact lenses according to a second embodiment. As in the first embodiment, contact lenses 120a, 120b, 120c have mutually different optical characteristics (e.g. refractive power) in the optical zone, and by being combined appropriately make up a series of contact lenses. In FIG. 4, components identical in structure to those in the first embodiment are assigned the same symbols in the drawing, and are not described in detail.

Specifically, contact lenses 120 (herein, in the case that specific symbols a, b, c are absent, lenses a, b, and c are referred to collectively) simply differ in terms of the diametrical locations of the back surface junction 32 and the second front surface junction 36, but have optical zone 28 and second peripheral zone 44 shapes that are generally the same as in the first embodiment. In the first peripheral zone 42, for which the setting differs from that in the first embodiment, the lens back surface 14 (portion composed of the inner peripheral portion of the back surface peripheral zone 18 and, in some instances, an area equal to this plus the outer peripheral portion of the back surface optical zone 16) is established generally the same as in the first embodiment, with only the diametrical locations of the back surface junction 32 and the second front surface junction 36 being different. In short, the characteristic element of contact lenses 120 of this embodiment differing from contact lenses 10 of the first embodiment is the surface shape of the first front surface peripheral zone 38 of the lens front surface 20.

In a contact lens 120 of this embodiment, the first front surface peripheral zone 38 has, by way of the illustrated cross sectional shape in the diametrical direction, a continuous, smoothly bowed surface having no inflection point. The inner peripheral edge portion of the first front surface peripheral zone 38 connects so as to be continuous via a common tangent with the outer peripheral edge portion of the front surface optical zone 22, at the first front surface junction 34 (the connection point $(X_1, Y_1)$ in FIG. 5). The outer peripheral edge portion of the first front surface peripheral zone 38 connects so as to be continuous via a common tangent with the inner peripheral edge portion of the second front surface peripheral zone 40, at the second front surface junction 36 (the connection point $(X_2, Y_2)$ in FIG. 5).

Figure 5:
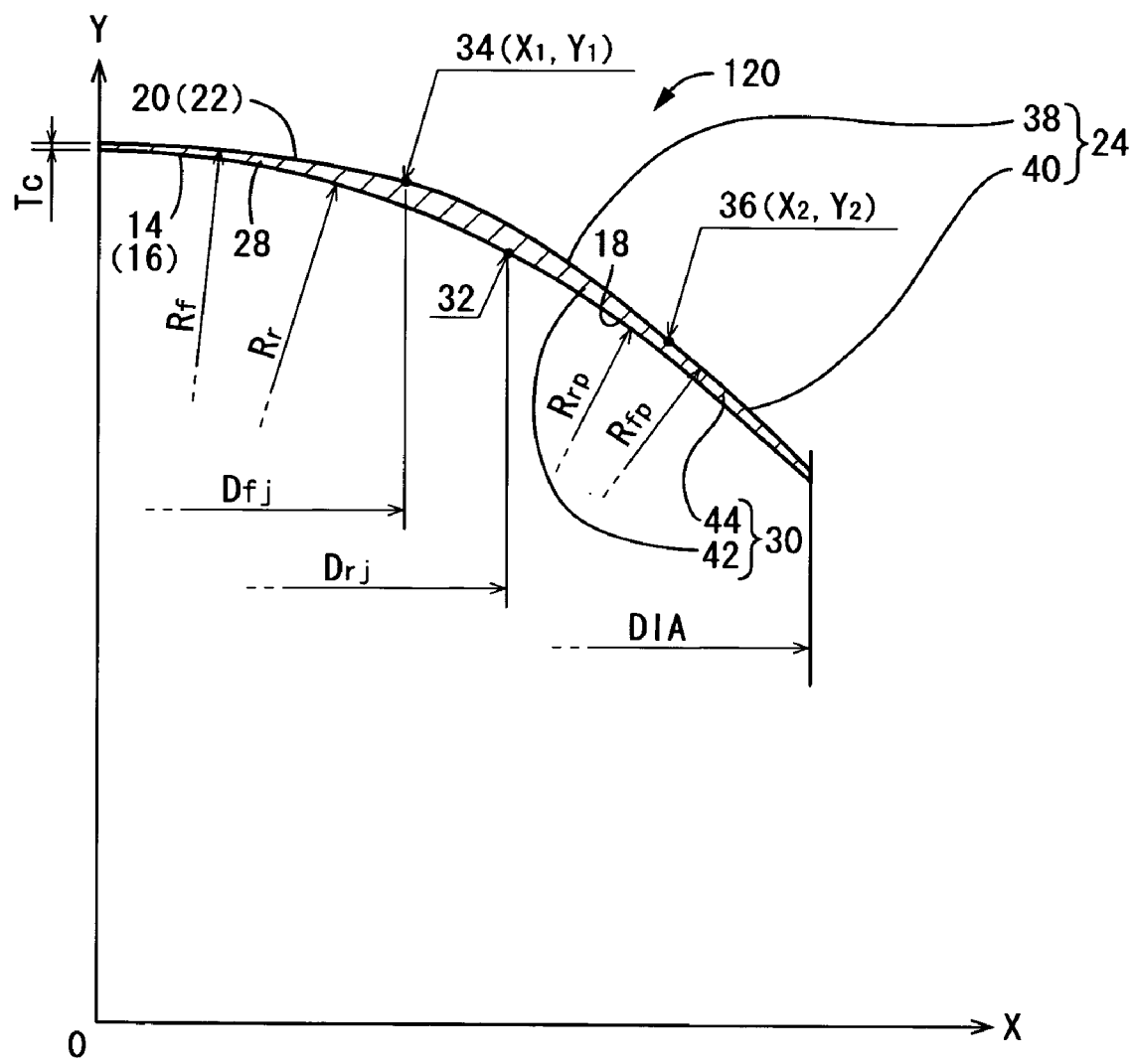
FIG. 5 is an enlarged fragmentary view of the contact lens shown in FIG. 4(*a*).

As shown in FIG. 5 depicting a specific shape for the peripheral zone 30 designed according to this embodiment, like in FIG. 2 in the first embodiment, over generally all of the lens front surface 20 from the front surface optical zone 22 formed with a radius of curvature: Rf appropriate for producing the target optical characteristics in the optical zone 28 to the second front surface peripheral zone 40 formed with a radius of curvature: Rfp appropriate for achieving consistent wear qualities of all contact lenses 120 making up the series, a smooth bowed surface shape with no inflection point is effectively imparted by means of specific lens surface shape in the first front surface peripheral zone 38 connecting the front surface optical zone 22 with the second front surface peripheral zone 40.

In short, the shape of the front surface optical zone 22 is important in terms of achieving target optical characteristics, and the shape of the second front surface peripheral zone 40 is important in terms of advantageously and consistently achieving target wear comfort and other handling properties. This embodiment specifically adjusts the shape of the first front surface peripheral zone 38, which has substantially no effect or relatively small effect on optical characteristics and wear comfort, while allowing freedom in terms of design of preferred shape for the shapes of the front surface optical zone 22 and the second front surface peripheral zone 40. Thus, it is possible in all of the contact lenses 120 making up the series to maintain adequately good wear comfort without adversely affecting optical characteristics, while avoiding the presence of inflection points on the lens surface, so as to achieve a higher level of wear comfort.

The specific shape of the first front surface peripheral zone 38 may be derived employing any of various appropriate functions as the diametrical shape, for example; in particular, a non-spherical surface equation, multidimensional equation, triangular equation or the like could be employed. Typically, the first front surface peripheral zone 38 is located with its center of curvature on the lens center axis 12 at any point.

Specifically, it would be possible to employ for the first front surface peripheral zone 38 an annular bowed surface of diametrical shape represented, for example, by a cubic equation and targeted for rotation in relation to the lens center axis 12, whereby it is possible to relatively easily design a smooth bowed surface overall, such that the connecting area with the second front surface peripheral zone 40 and front surface optical zone 22 at the inner and outer peripheral edge portions in the first front surface peripheral zone 38 have a common tangent.

Manufacture of contact lenses 120 of construction according to this embodiment may of course advantageously employ method similar to those in the first embodiment described previously.

Following is a description of a specific example of a design wherein, in a contact lens 10 described in the above embodiment, only the shape of the first front surface peripheral zone 38 differs, with the shape of the first front surface peripheral zone 38 in the diametrical direction being represented by a cubic equation, so as to connect with the front surface optical zone 22 and second front surface peripheral zone 40 at connecting point having a common tangent.

In the following description employs X-Y orthogonal coordinates as shown in FIG. 5, wherein the lens center axis 12 is designated as the Y axis, and the diametrical line at a right angle to the center axis 12 is designated as the X axis.

First, the basic shape of the contact lens is established in the following manner.

(i) Shape of front surface optical zone 22

The front surface optical zone 22 is a spherical surface represented by Eq. ① below.

$$X^2 + (Y-K)^2 = FC^2 \qquad \text{Eq. ①}$$

FC: radius of curvature of front curve (spherical surface)
K: Y segment of front curve
Values of FC and K are calculated in advance by means of optical calculations (ray tracing or the like).

(ii) Coordinates of outer peripheral portion side (end point side) end portion of front surface optical zone 22

Coordinates of the outer peripheral edge portion (end point) of front surface optical zone 22 are designated $(X_1, Y_1)$.

Values of $X_1, Y_1$ are calculated in advance, with consideration given to the outside diameter dimension of the front surface optical zone 22.

(iii) Shape of second front surface peripheral zone 40

The second front surface peripheral zone 40 is given an elliptical surface represented by Eq. ② below.

$$X^2/M^2 + (Y-L)^2/N^2 = 1 \qquad \text{Eq. ②}$$

L: Y segment of center of ellipse
M: ellipse axis (X axis direction)
N: ellipse axis (Y axis direction)
Values of L, M, and N are calculated in advance on the basis of the established value for thickness of the peripheral zone 30.

(iv) Coordinates of inner peripheral side (start point side) end portion of second front surface peripheral zone 40

Coordinates of the inner peripheral edge portion (start point) of second front surface peripheral zone 40 are designated $(X_2, Y_2)$.

Appropriate values of $X_2, Y_2$ are calculated in advance, within a range such that the value of [radial dimension at location of second front surface junction 36: $X_2$/outer peripheral radial dimension of contact lens 120: DIA/2] is within the range 0.5–0.9.

(v) Cubic equation representing calculated diametrical shape of first front surface peripheral zone 38

The cubic equation representing the shape of the first front surface peripheral zone 38 to be calculated contacts the front surface optical zone 22 outer peripheral edge portion (end point) and the second front surface peripheral zone 40 inner peripheral edge portion (start point) at both edge portions (start point and end point) via a common tangent, and is represented by Eq. ③ below.

$$Y = AX^3 + BX^2 + CX + D \qquad \text{Eq. ③}$$

A, B, C and D in Eq. ③ are variables to be calculated.

Here, calculation of A, B, C and D in Eq. ③ in order to arrive at a shape for the first front surface peripheral zone 38 may be accomplished in the following manner, for example.

First, the aforementioned Eq. ①, Eq. ② and Eq. ③ are differentiated to arrive at the following equations Eq. ④, Eq. ⑤, Eq. ⑥.

$$dY/dX = -X/(Y-K) \qquad \text{Eq. ④}$$

$$dY/dX = -N^2 X/(M^2(Y-L)) \qquad \text{Eq. ⑤}$$

$$dY/dX = 3AX^2 + 2BX + C \qquad \text{Eq. ⑥}$$

Next, due to the condition that since there is a common tangent at point $(X_1, Y_1)$, the value (dY/dX) of the slope of front surface optical zone 22 represented by Eq. ④ and the value (dY/dX) of the slope of the first front surface peripheral zone 38 represented by Eq. ⑥ are equal, it is possible to derive Eq. ⑦ below.

$$-X_1/(Y_1-K) = 3AX_1^2 + 2BX_1 + C \qquad \text{Eq. ⑦}$$

(With the proviso that $Y_1 - K \neq 0$)

Further, due to the condition that since there is a common tangent at point $(X_2, Y_2)$, the value (dY/dX) of the slope of second front surface peripheral zone 40 represented by Eq. ⑤ and the value (dY/dX) of the slope of the first front surface peripheral zone 38 represented by Eq. ⑥ are equal, it is possible to derive Eq. ⑧ below.

$$-N^2 X_2/(M^2(Y_2-L)) = 3AX_2^2 + 2BX_2 + C \qquad \text{Eq. ⑧}$$

(With the proviso that $Y_2 - L \neq 0$)

Since the first front surface peripheral zone 38 represented by Eq. ③ passes through point $(X_1, Y_1)$, it is possible to derive Eq. ⑨ below.

$$Y_1 = AX_1^3 + BX_1^2 + CX_1 + D \qquad \text{Eq. ⑨}$$

Also, since the first front surface peripheral zone 38 represented by Eq. ③ passes through point $(X_2, Y_2)$, it is possible to derive Eq. ⑩ below.

$$Y_2 = AX_2^3 + BX_2^2 + CX_2 + D \qquad \text{Eq. ⑩}$$

Accordingly, the four-dimensional linear simultaneous equations given in ⑪–⑭ below can be determined from the above four equations ⑦, ⑧, ⑨ and ⑩.

$$3X_1^2 \times A + 2X_1 \times B + 1 \times C + 0 \times D = -X_1/(Y_1-K) \qquad \text{Eq. ⑪}$$

$$3X_2^2 \times A + 2X_2 \times B + 1 \times C + 0 \times D = -N^2 X_2/(M^2(Y_2-L)) \qquad \text{Eq. ⑫}$$

$$X_1^3 \times A + X_1^2 \times B + X_1 \times C + 1 \times D = Y_1 \qquad \text{Eq. ⑬}$$

$$X_2^3 \times A + X_2^2 \times B + X_2 \times C + 1 \times D = Y_2 \qquad \text{Eq. ⑭}$$

Thus, by solving the resultant simultaneous equations, it is possible to calculate the variables: A, B, C, D in Eq. ③ above, and thus to identify a shape for the first front surface peripheral zone 38. Solving of the simultaneous equations may be carried out easily using Cramer's rule or the like.

While the invention have been described in detail hereinabove in terms of certain preferred embodiments, the embodiments herein are merely exemplary, and the invention should not be construed as being limited in any way to the specific disclosure of the embodiments herein. While not given individually herein, the present invention may be reduced to practice in various other modes incorporating variations, modifications and improvements which would be apparent to those skilled in the art, and these embodiments will of course fall within the scope of the invention insofar as they do not depart from the spirit thereof.

For example, the invention is applicable to both hard contact lenses and soft contact lenses consisting of various kinds of materials. It is of course possible to have an optical zone with toric power or the like.

In the peripheral zone, shape in the circumferential direction about the center axis could be varied so that when worn, the contact lens is positioned in the circumferential direction. Even where such a peripheral zone shape which is not rotational symmetric about the center axis is employed, when making a series of contact lenses according to the invention, the shape of the peripheral zone will be identical in all of the contact lenses making up the contact lens series.

Additionally, the invention relating to series contact lenses is advantageously implemented in series contact lenses composed of a plurality of contact lens combinations for which mutually different diopter powers are established in a predetermined diopter power area, whereby there can be achieved the significant technical advantage that excellent wear comfort can be provided consistently in contact lenses over a diopter power distribution area of, for example, from 5 diopters up to 10 diopters or more. However, there are various kinds of series contact lenses, and a series of contact lenses could also be composed on the basis of the same lens material, for example. When implementing the invention in such a series of contact lenses, it would not be necessary to form all of the contact lenses of the series in accordance with the invention, it being possible for the series to include specialty contact lenses imparted with special shape for a particular specialized purpose, for example. Specifically, when implementing the invention in a series of contact lenses composed, for example, on the basis of a given lens material, and including in a given series one or several contact lenses having prism ballast functionality or contact lenses with exceedingly different diopter powers for use under special conditions, the invention could be implemented in all of the lenses except for these specialty lenses.

Each contact lens making up a series of contact lenses in the invention may have aspheric shape for the optical zone front surface and back surface, and/or the peripheral zone front surface and back surface. In detail, the invention is also applicable, for example, to toric contact lenses or contact lenses of multifocal type or progressive type whose front surface optical zone has aspheric shape.

As will be apparent from the preceding description, series contact lenses made in accordance with the present invention are based on the novel technical concept, not contemplated in the past, of a standardized shape for the peripheral zone, and due to the fact that the shape of most of the peripheral zone is identical for any contact lens of the series, is able to provide the wearer with consistently good wear comfort, tear fluid exchange, lens position stability, and the like, regardless of the optical characteristics of the optical zone selected for a particular wearer.

In contact lenses of structure according to the invention, by disposing a first peripheral zone of given thickness dimension extending in the diametrical direction between the optical zone and the second peripheral zone, it is possible to establish a small maximum thickness dimension regardless of the diopter power of the optical zone, and to thereby reduce pressure on the conjunctiva and the eyelid, as well as lessening the tendency to catch during blinking, so that further improved wear comfort may be achieved.

Additionally, according to the production method of the invention, when making contact lenses with different optical characteristics, it is possible to use a standard mold, thereby affording reductions in production costs, as well as imparting a fixed shape to the peripheral zone during molding of contact lenses with different optical characteristics, so that the amount of deformation accompanying polymerization shrinkage, thermal shrinkage and the like during the molding process can be made uniform, thereby achieving excellent molding accuracy.

INDUSTRIAL APPLICABILITY

As will be apparent from the description hereinabove, according to the present invention, there is now advantageously provided series contact lenses having an assortment of mutually different corrective diopter powers or the like, each of which has in common good wear comfort and the like, for high performance.

The invention claimed is:

1. A series of contact lenses provided as an assorted plurality of contact lenses, each of the contact lenses being formed with an optical zone in a lens center area and a peripheral zone in a lens peripheral area, by forming a back surface optical zone in a center portion of a lens back surface as well as forming a back surface peripheral zone to an outer peripheral side of the back surface optical zone, while forming in a center portion of a lens front surface a front surface optical zone as well as forming a front surface peripheral zone to an outer peripheral side of the front surface optical zone, and each of the contact lenses having a constant entire lens diameter dimension but mutually different optical characteristics in the optical zone, the series of contact lenses being characterized in that in the assorted plurality of contact lenses, a shape of the lens back surface is identical for each lens, and a shape of an area extending a predetermined width in a diametrical direction of a peripheral portion in the front surface peripheral zone is identical for each lens, whereby while a shape of a portion extending a predetermined width in the diametrical direction of at least a peripheral portion in the front surface peripheral zone; and is identical for each lens, a shape of the front surface optical zone differs among the lenses so that the optical characteristics of the optical zone differs among the lenses, wherein different degrees of refractive power of the optical zone are established in the assorted plurality of contact lenses so that optical characteristics of the optical zone differ, and a diameter of the front surface optical zone is varied depending on differences in refractive power of the optical zones.

2. A series of contact lenses according to claim 1, wherein the diameter of the front surface optical zone is set to within a range $\phi 5$ mm–$\phi 2$ mm in each of the assorted plurality of contact lenses.

3. A series of contact lenses according to claim 1, wherein different degrees of refractive power of the optical zone are established in the assorted plurality of contact lenses so that optical characteristics of the optical zone differ, and a center portion thickness of the front surface optical zone is varied depending on differences in refractive power of the optical zones.

4. A series of contact lenses according to claim 3, wherein the center portion thickness of the optical zone is set to within a range of 0.02 mm–0.70 mm in each of the assorted plurality of contact lenses.

5. A series of contact lenses according to claim 1, wherein different degrees of refractive power of the optical zone are established in the assorted plurality of contact lenses so that optical characteristics of the optical zone differ among these lenses, and the different degrees of refractive power of the optical zone are established within a range of −25 diopters to +25 diopters, with a difference of at least 5 diopters.

6. A series of contact lenses according to claim 1, wherein in each of the assorted plurality of contact lenses, the front surface peripheral zone is composed of a first front surface peripheral zone situated on an inner peripheral side and a second front surface peripheral zone situated on an outer peripheral side, with a first peripheral zone being formed between the first front surface peripheral zone and the lens back surface, and with a second peripheral zone being formed between the second front surface peripheral zone and the lens back surface, the second peripheral zone having a shape that decreases in thickness gradually going towards the outer peripheral side, and wherein among the assorted plurality of contact lenses, each the second peripheral zone is of identical shape, and the first front surface peripheral zone has a smooth surface connecting to both the front surface optical zone and the second front surface peripheral zone in the diametrical direction at a continuous face having a common tangent.

7. A series of contact lenses according to claim 6, wherein the first front surface peripheral zone is represented by a cubic curve in the diametrical direction.

8. A series of contact lenses according to claim 1, wherein in each of the assorted plurality of contact lenses, the diameter of the front surface optical zone is smaller than the diameter of the back surface optical zone, while the front surface peripheral zone is composed of a first front surface peripheral zone situated on an inner peripheral side and a second front surface peripheral zone situated on an outer peripheral side, and has a shape with the first front surface peripheral zone being in a location generally corresponding to the back surface optical zone, and with the back surface optical zone offset.

9. A series of contact lenses according to claim 8, wherein in each of the assorted plurality of contact lenses, a first peripheral zone of generally constant thickness is formed by the first front surface peripheral zone and the back surface optical zone, and the second front surface peripheral zone is situated in a location generally corresponding to the back surface peripheral zone, the second front surface peripheral zone and back surface peripheral zone forming a second peripheral zone that decreases in thickness going towards the outer peripheral side, the peripheral zone being composed of the first peripheral zone and the second peripheral zone, and wherein in among the assorted plurality of contact lenses, each the second peripheral zone has identical shape and each the first peripheral zone has identical thickness, while a diametrical width dimension of the first peripheral zones vanes.

10. A series of contact lenses according to claim 1, wherein at least a portion of the contact lenses are formed by molding, and a molding material for the assorted plurality of contact lenses is a soft material containing silicone.

11. A series of contact lenses according to claim 1, wherein in the assorted plurality of contact lenses, at least a portion of the contact lenses are formed by molding, the Young's modulus: y of a molding material is $0.2 \text{ MPa} \leq y \leq 2.0 \text{ MPa}$; and the value of average thickness: Tm of said peripheral zone is $0.05 \text{ mm} \leq Tm \leq 0.30 \text{ mm}$.

12. A series of contact lenses according to claim 1, wherein in the assorted plurality of contact lenses, at least a portion of the contact lenses are formed by molding, the Young's modulus: y of a molding material is $300 \text{ MPa} \leq y \leq 1500 \text{ MPa}$; and the value of average thickness: Tm of said peripheral zone is $0.08 \text{ mm} \leq Tm \leq 0.50 \text{ mm}$.

13. A series of contact lenses according to claim 1, wherein the back surface peripheral zone has a curving surface with a radius of curvature greater than that of the back surface optical zone in the diametrical direction.

14. A method of manufacturing a contact lens constituting a series of contact lenses provided as an assorted plurality of contact lenses, each of the contact lenses being formed with an optical zone in a lens center area and a peripheral zone in a lens peripheral area, by forming a back surface optical zone in a center portion of a lens back surface as well as forming a back surface peripheral zone to an outer peripheral side of the back surface optical zone, while forming in a center portion of a lens front surface a front surface optical zone as well as forming a front surface peripheral zone to an outer peripheral side of the front surface optical zone, and each of the contact lenses having a constant entire lens diameter dimension but mutually different optical characteristics in the optical zone, the series of contact lenses being characterized in that in the assorted plurality of contact lenses, a shape of the lens back surface is identical for each lens, and a shape of an area extending a predetermined width in a diametrical direction of a peripheral portion in the front surface peripheral zone is identical for each lens, whereby while a shape of a portion extending a predetermined width in the diametrical direction of at least a peripheral portion in the front surface peripheral zone is identical for each lens, a shape of the front surface optical zone differs among the lenses so that the optical characteristics of the optical zone differs among the lenses, wherein an entirety of the lens back surface including the back surface optical zone and the back surface peripheral zone, and an area of predetermined diametrical width of at least an outer peripheral portion of the front surface peripheral zone are shaped by molding, and wherein different degrees of refractive power of the optical zone are established in the assorted plurality of contact lenses so that optical characteristics of the optical zone differ, and a diameter of the front surface optical zone is varied depending on differences in refractive power of the optical zones.

* * * * *